(12) United States Patent
Crider et al.

(10) Patent No.: US 7,535,358 B2
(45) Date of Patent: May 19, 2009

(54) METHOD AND APPARATUS FOR ELECTRONICALLY TRACKING LUGGAGE

(75) Inventors: Elaine A. Crider, 501 Trenton St., SE., Washington, DC (US) 20032; Valerie D. Francies, 3850 Nash St., SE., Washington, DC (US) 20020

(73) Assignees: Elaine A. Crider, Washington, DC (US); Valerie D. Francies, Washington, DC (US)

( * ) Notice: Subject to any disclaimer, the term of this patent is extended or adjusted under 35 U.S.C. 154(b) by 128 days.

(21) Appl. No.: 11/375,129

(22) Filed: Mar. 15, 2006

(65) Prior Publication Data

US 2007/0222587 A1 Sep. 27, 2007

(51) Int. Cl.
G08B 13/14 (2006.01)
G08B 13/08 (2006.01)

(52) U.S. Cl. .............. 340/572.1; 340/545.6; 340/568.1; 340/571; 340/568.8

(58) Field of Classification Search .............. 340/572.1, 340/545.6, 545.7, 568.1, 568.6, 571
See application file for complete search history.

(56) References Cited

U.S. PATENT DOCUMENTS

| | | | | |
|---|---|---|---|---|
| 5,111,184 | A * | 5/1992 | Heaton et al. ............... | 340/542 |
| 5,751,246 | A * | 5/1998 | Hertel .................... | 340/825.49 |
| 5,894,266 | A | 4/1999 | Wood, Jr. et al. | |
| 5,917,433 | A * | 6/1999 | Keillor et al. ............... | 340/989 |
| 6,087,965 | A | 7/2000 | Murphy | |
| 6,263,280 | B1 * | 7/2001 | Stingone, Jr. ............... | 701/213 |
| 6,415,219 | B1 * | 7/2002 | Degodyuk ............... | 340/539.1 |
| 6,556,138 | B1 | 4/2003 | Sliva et al. | |
| 6,624,752 | B2 * | 9/2003 | Klitsgaard et al. ....... | 340/572.1 |
| 6,847,892 | B2 * | 1/2005 | Zhou et al. ............. | 340/426.19 |
| 6,933,851 | B2 | 8/2005 | Hahne et al. | |
| 6,947,513 | B2 | 9/2005 | O'Toole et al. | |
| 6,972,677 | B2 | 12/2005 | Coulthard | |
| 7,027,808 | B2 * | 4/2006 | Wesby ...................... | 340/853.1 |
| 7,088,229 | B2 * | 8/2006 | Johnson ...................... | 340/505 |
| 7,135,976 | B2 * | 11/2006 | Neff et al. ................ | 340/572.1 |
| 7,154,390 | B2 * | 12/2006 | Giermanski et al. ..... | 340/539.22 |
| 7,183,920 | B2 * | 2/2007 | Napolitano .............. | 340/572.1 |
| 7,243,845 | B2 * | 7/2007 | Cash et al. .................. | 345/384 |
| 7,277,014 | B1 * | 10/2007 | Waterhouse et al. ..... | 340/572.1 |
| 2002/0089434 | A1 | 7/2002 | Ghazarian | |
| 2003/0011466 | A1 * | 1/2003 | Samuel et al. ............. | 340/5.73 |
| 2003/0067542 | A1 | 4/2003 | Monroe | |
| 2003/0122670 | A1 * | 7/2003 | Stern et al. ............... | 340/568.1 |
| 2004/0041706 | A1 | 3/2004 | Stratmoen et al. | |

(Continued)

FOREIGN PATENT DOCUMENTS

DE 2381363 A * 4/2003

(Continued)

*Primary Examiner*—Eric M Blount
(74) *Attorney, Agent, or Firm*—Dickstein Shapiro LLP

(57) ABSTRACT

The invention includes an electronic luggage tag that uses GPS technology to both track luggage, and record the specific times and places that a specific piece of luggage is opened. The invention is designed to prevent luggage theft and additionally to provide users the ability to track the location of lost luggage. The tag device has two components: a luggage tag having an implanted GPS chip and, a separate receiving device for receiving a transmitted signal from the luggage tag.

17 Claims, 2 Drawing Sheets

U.S. PATENT DOCUMENTS

2004/0183672 A1* 9/2004 Krishan et al. ......... 340/539.13
2004/0246097 A1 12/2004 Queenan
2005/0258955 A1 11/2005 Gloekler et al.
2006/0220857 A1* 10/2006 August et al. ............ 340/572.1
2006/0266563 A1* 11/2006 Kaplan ....................... 177/245
2007/0094128 A1* 4/2007 Rung et al. .................... 705/38
2007/0152825 A1* 7/2007 August et al. ............ 340/572.1

FOREIGN PATENT DOCUMENTS

| JP | 10109584 | 4/1998 |
| JP | 10302197 | 11/1998 |
| JP | 2001175983 | 6/2001 |
| WO | WO 2005041131 | 5/2005 |

* cited by examiner

METHOD AND APPARATUS FOR ELECTRONICALLY TRACKING LUGGAGE

FIELD OF THE INVENTION

In general, the invention relates to a system and method for monitoring and tracking luggage, and more particularly to an electronic luggage tag that uses GPS technology to both track luggage, and record the specific time and location that the luggage is opened.

BACKGROUND OF THE INVENTION

In today's world of traveling, luggage is constantly moving domestically and internationally. Often times, bags or other pieces of luggage are lost or damaged and thus need to be monitored or tracked for liability purposes. It is useful to those burdened with the responsibility of monitoring or tracking these pieces of luggage to have real-time information about the status and location of the luggage. For example, it is useful to know the location, the condition, and whether the luggage has been accessed or tampered with by any unauthorized parties. Luggage can include items such as: clothes, high value tangibles, jewels, cash, etc. Therefore, the location and condition of the luggage/bags can be of great importance. Additionally, it is important to travelers to have the ability to narrow the number of people with access to a piece of luggage at a specific time to protect and assist them in claims against baggage handlers such as TSA and airlines in the event of theft. A variety of means are employed currently in an attempt to achieve this level of monitoring and tracking.

For example, one conventional technique is to place the luggage under lock and key at the departure point, and then unlock the luggage at the point of destination. However, this method has limited commercial success as it does not provide information as to either the condition of the luggage during traveling, or if the luggage has been taken on a detour during the trip. Nor is any indication given if a duplicate key (or other mechanism) was used to gain access to the luggage during transit, and then relocked to conceal that access. Moreover, due to present day security concerns, it is no longer possible to place luggage under lock and key for the duration of a trip.

A global positioning system (GPS) is a partial solution to the conventional lock problem. GPS has been used for tracking and monitoring automobiles and other high value items. Additionally, current monitoring practices also include luggage having an electronic seal and using GPS location logging. The electronic seal not only provides a tamper detection function but can also be used to carry data related to the luggage. The GPS logging function permits detection of a deviation from the planned transit route at the destination point. However, these methods do not provide information on access or condition during traveling. Thus, such a system utilizing only standalone electronic seals and GPS logging does not provide adequate security. For example, the GPS could be tracking a piece of luggage moving with the bag truck and the GPS logging function would simply have the capability to provide information on its continuously changing location and not whether the luggage is being accessed.

Other current burglar alarm technology utilizes continuous conductive strips on windows and doors. However, these strips, like any conductive strip, may be jumpered around and therefore, defeated. Moreover, the use of such conductive strips on pieces of luggage is not conducive to durability or function.

In view of these difficulties, it would be useful to those charged with the responsibility for the shipment of luggage to continuously know the luggage's condition, if it was accessed or tampered with, as well as its location.

BRIEF SUMMARY OF THE INVENTION

The invention is an electronic luggage tag that uses GPS technology to both track luggage, and record the specific times and places that a specific piece of luggage is opened. The invention is designed to prevent luggage theft and additionally to provide users the ability to track the location of lost luggage.

The tag device has two components. One component comprises a luggage tag having an implanted GPS chip. The second component comprises a separate receiving device for receiving a transmitted signal from the luggage tag. For example, the receiving device could be a handheld device or a computer terminal that is capable of receiving the signal from the luggage tag.

Periodically, the luggage tag transmits a signal to the receiving device which in turn records the time, date and GPS coordinates of the tag's location. In addition, each time the piece of luggage is opened, the luggage tag will transmit a signal to the receiving device which in turn records that the luggage has been opened, the time, date and tag's location based on GPS coordinates. Using the recorded information, a user has the ability to identify the exact location of his/her luggage or identify a time and place when the luggage was opened.

BRIEF DESCRIPTION OF THE DRAWINGS

The foregoing and other advantages and features of the invention will become more apparent from the detailed description of exemplary embodiments provided below with reference to the accompanying drawings in which.

DETAILED DESCRIPTION OF THE INVENTION

The above-mentioned problems are solved by the invention described below. The invention includes an electronic luggage tag that uses GPS technology to both track luggage, and record specific times and places that a luggage (e.g., suitcase or bag) is opened. The electronic luggage tag tracking system 10 comprises an electronic luggage tag 100 and an electronic luggage tag receiver 200. The electronic luggage tag 100 includes a transmitter having an implanted GPS chip. The electronic luggage tag receiver 200 includes a receiver for receiving a transmitted signal produced by the electronic luggage tag 100.

Figure 1:
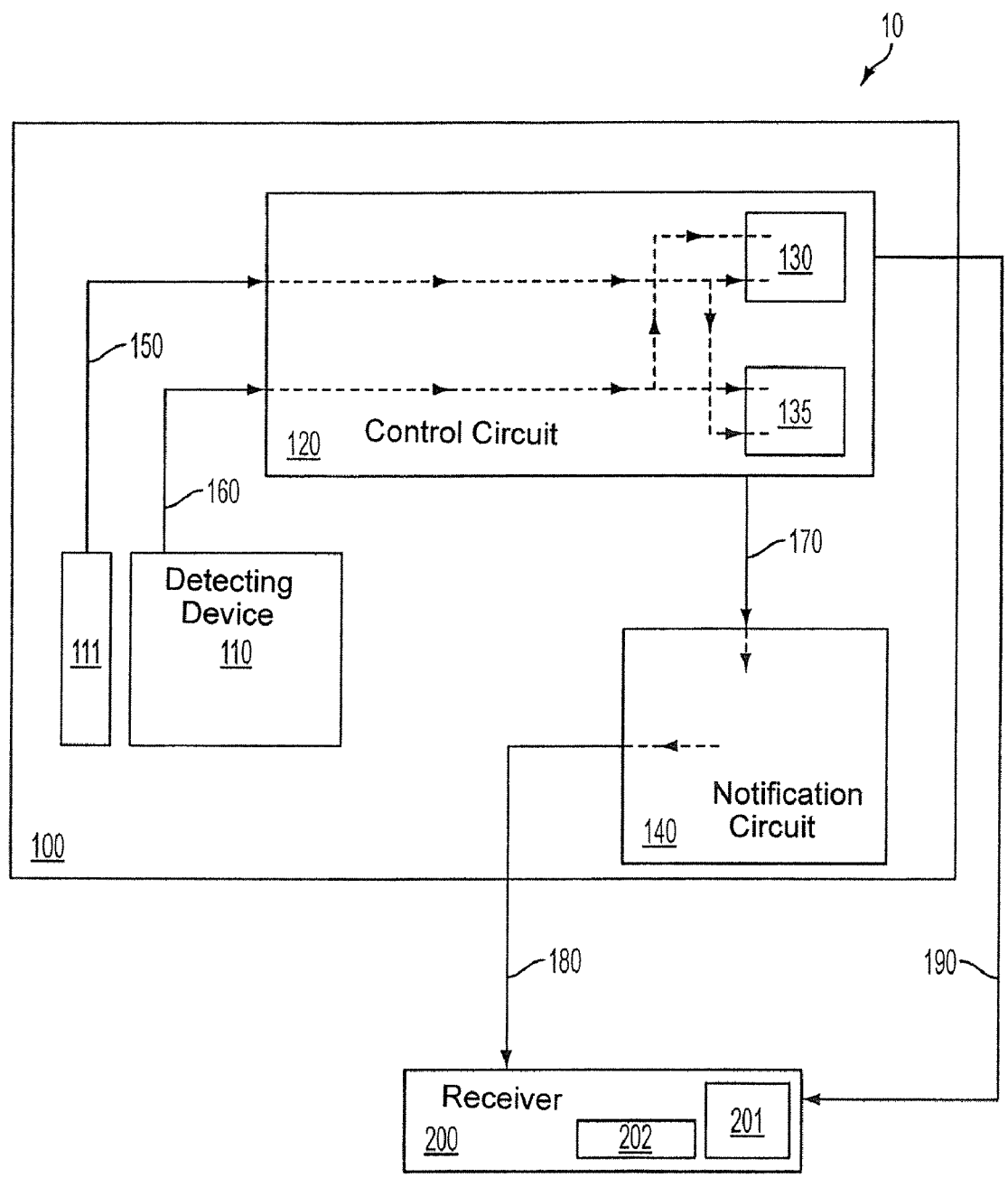
FIG. 1 is a general schematic overview of a system according to an exemplary embodiment of the invention.

FIG. 1 shows a general schematic overview of the electronic luggage tag tracking system 10 according to an exemplary embodiment of the invention. The electronic luggage tag 100 comprises a detecting device 110 for monitoring the opening and closing of a piece of luggage, a timing device 111 for periodically transmitting a timing signal 150, and a control circuit 120 having an implanted GPS chip 130 for generating and transmitting a signal 190 to the electronic luggage tag receiver 200 in response to the timing signal 150 or a detection signal 160. The detecting device 110 uses motion detection and/or light sensing technology to detect whether the luggage is open or closed. Additionally, the detecting device 110 is able to distinguish between items inside the luggage moving around during handling versus physically moving the luggage. When an open status has been detected by the detecting device 110, the detection signal 160 is transmitted within the electronic luggage tag 100 to the control circuit 120. The control circuit 120 receives the signal 160 and immediately records the date, time and location of the luggage from GPS chip 130. The date, time and location is considered the status information. The status information is then recorded in a storage device 135 within the control circuit 120 and can be stored passively or delivered in real-time, via an alert signal 190, to the electronic luggage tag receiver 200 held by the luggage owner, user of the device, and/or other responsible party.

It should be appreciated that the electronic luggage tag 100 is capable of alerting a luggage owner, user of the device, and/or other responsible party using any type of communication means known in the art. It should be appreciated that the device is not limited to a single communication but can communicate with multiple email addresses or phone numbers simultaneously. The electronic luggage tag 100 communicates with the electronic luggage tag receiver 200 in any method programmed by the user and stored as user preferences. It should also be appreciated that the electronic luggage tag 100 has the capability to be programmed to also detect weight changes within the luggage.

In addition, the timing device 111 periodically transmits the tracking signal 150 to the control circuit 120 which in turn records the time, date and GPS coordinates of the luggage location from GPS chip 130. The timing device 111 is programmed to send the signal 150 at a predetermined interval allowing the control circuit 120 to create a recorded trail of tracking information. The tracking information is then recorded in the storage device 135 within the control circuit 120 and stored along with the status information. The information can be stored passively or delivered in real-time, via the alert signal 190, to the electronic luggage tag receiver 200. It should be appreciated that the created alert signal 190 can be delivered by any method similar to the status information described above.

Additionally, the status and/or tracking information can be delivered to a user periodically through a notification circuit 140. The notification circuit 140 is part of the electronic luggage tag 100. Using the notification circuit 140, the electronic luggage tag 100 can periodically forward the passively stored status and tracking information to the user at predetermined intervals. This is different than sending the status and tracking information in real-time. The notification circuit 140 sends an alert signal 180 at predetermined intervals to the electronic luggage tag receiver 200 to update the user on the current status and tracking information. Similar to the other alert signals, the alert signal 180 can be delivered by any method described above.

The electronic luggage tag 100 is designed to be located on the luggage itself. The tag 100 can be located inside or outside the luggage. For example, the tag 100 can be located in one of the corners or along one of the edges of the luggage where it would be exposed to light when the luggage is opened or the items inside are moved around, or the tag 100 can be attached to the handle of a piece of luggage. In addition, the tag 100 could be located on the inside of the top cover or flap of the luggage which would immediately expose the tag 100 to light or motion when the luggage is opened. It should be appreciated that although the location of the invention has been described in relation to examples, in no way is the list of examples an exhaustive list of possible locations for the electronic luggage tag 100. The exact location of the electronic luggage tag 100 is dependent on the style of the particular piece of luggage, the preference of the user of the piece of luggage, as well as the specific purpose of the tag intended by the user. The preferred embodiment of the invention generally locates the electronic luggage tag in a secure and undetectable location from those possibly entering the luggage, but also in a location that maximizes the tag's potential exposure to light and/or motion detection.

In the preferred embodiment, the electronic luggage tag 100 is designed to be a small, non-intrusive device capable of being secured to any piece of luggage, permanently or temporarily. The tag 100 is comprised of an anti-theft and tamper resistant material. The tag 100 is able to withstand the normal pressures and stresses applied by the typical baggage handler. The tag 100 is designed to be temperature and weather resistant. The tag 100 is powered by rechargeable and/or replaceable batteries. In addition, the tag 100 has the ability to monitor the battery level and alert the electronic luggage tag receiver 200 when the battery level is becoming low. The tag 100 has a storage device 135, ideally having of memory size of about 1 MB. The storage device 135 is designed to have the highest possible data storage capacity without making the device size undesirable. The tag 100 has the ability to output data in a number of formats including RTF (text files with HTML links), XLS (Microsoft Excel), HTML (web pages with graphics and maps), KML (interfacing with Google™ earth), etc. The tag 100 is Universal Serial Bus (USB) compatible for easy download capability and for easy transferring of stored data.

Referring still to FIG. 1, the electronic luggage tag receiver 200 is for receiving the transmitted alert signals from the electronic luggage tag 100. The electronic luggage tag receiver 200 alerts the user of, and displays, the incoming status and tracking information. The electronic luggage tag receiver 200 can comprise a personal electronic luggage tag receiver having a display screen, or be connected to general electronic devices such as a handheld device (e.g., a cell phone or PDA), a computer or laptop, or a standard, common GPS receiver as known in the art using a software program stored in a storage device 202. The electronic luggage tag receiver 200 additionally comprises GPS/mapping software stored in the storage device 202. The stored status and tracking information can be stored in the storage device 202 indefinitely, or for a period programmed by the user. For example, the information could be automatically deleted after a certain period of time, or deleted when triggered by some action by the user. The user can also choose to delete or save any desired stored information. A user can use the electronic luggage tag receiver 200 to generate reports, graphs and maps based on the stored status and tracking information.

The electronic luggage tag receiver 200 can be small or large in size. The small receiver can be very small, e.g., the size of any car alarm remote or house alarm remote as known in the art, and has the capability to send alerts in the form of beeps, vibration, flashing light, etc. when an alert signal has been received. However, the electronic luggage tag receiver 200 can be larger in size and can comprise a map display 201. The larger receiver also has the ability to send alerts in the form of beeps, vibration, flashing light, etc. when an alert signal has been received.

It should be appreciated that the electronic luggage tag can be enclosed in a durable protective case requiring a special key, code or other security measure to gain entry. The electronic tracking device is compatible with most computer operating systems, mapping software and handheld software already known in the art.

The electronic tracking device is designed to be used by any person who travels for business, vacation or any other purpose to monitor and track their own individual pieces of luggage. The electronic tracking device can also be used by anyone or business that handles luggage during the ordinary course of business such as consumers, airlines, airports, bus lines, cruise lines, rail companies, hotels, luggage manufacturers, etc. In addition, the electronic tracking device is designed to be used by specific baggage tracking companies or services. It should be appreciated that the system of the claimed invention is not limited to only the luggage industry, but can be used and applied to any industry needing to monitor items.

Figure 2:
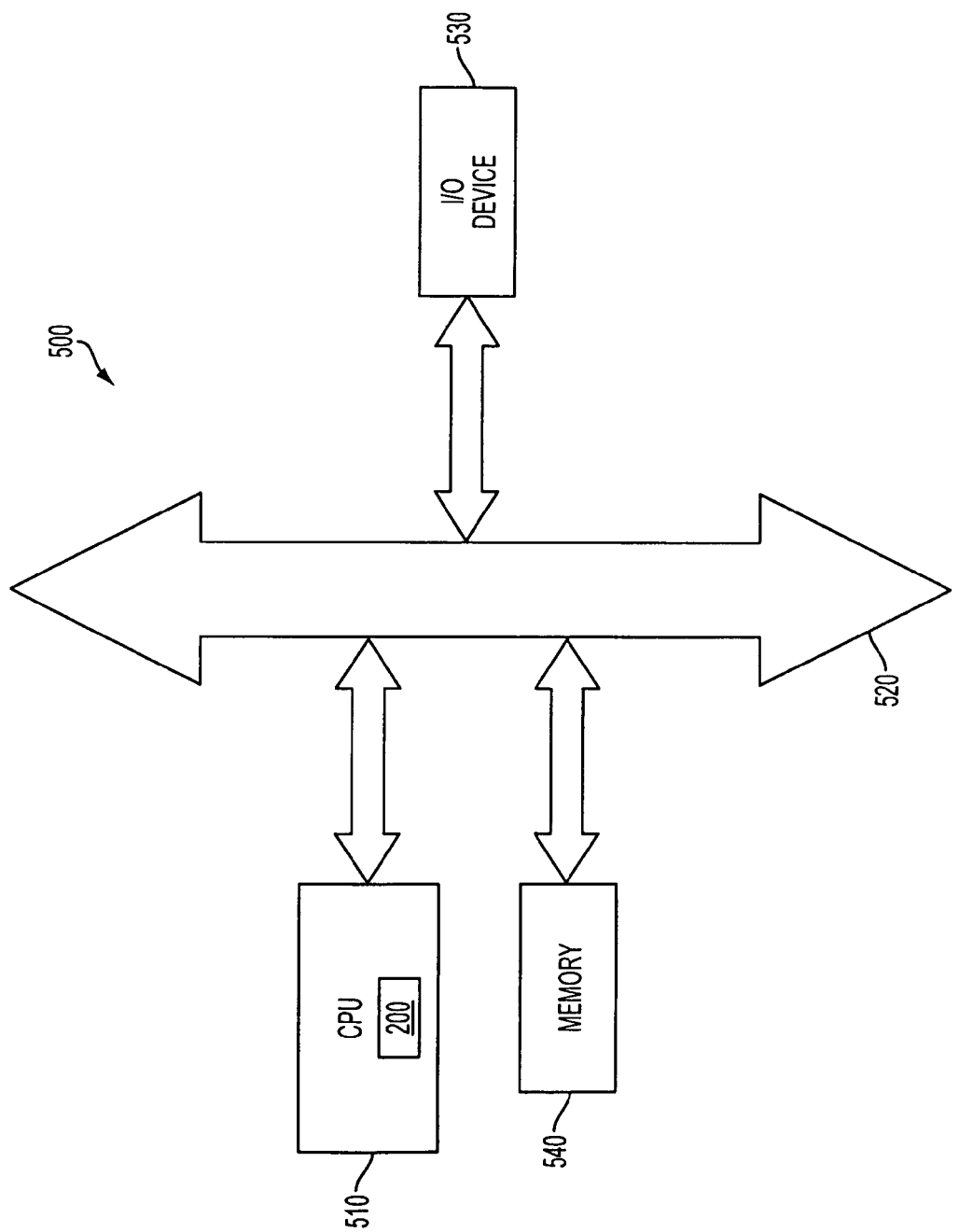
FIG. 2 is a processor system including the present invention.

FIG. 2 shows system 500, a typical processor system modified to include the system 10 for electronically tracking luggage of the present invention. Examples of processor based systems which may employ the system 10 for electronically tracking luggage include without limitation, computer systems, aircraft/vehicle navigation systems, telephones, surveillance systems and others.

System 500 includes a central processing unit (CPU) 510 that communicates with various devices over a bus 520. Some of the devices connected to the bus 520 provide communication into and out of the system 500, illustratively including an input/output (I/O) device 530 and system 10 for electronically tracking luggage 10. Other devices connected to the bus 520 provide memory, illustratively including a CPU 510 incorporating the system 10 for electronically tracking luggage illustrated in FIG. 1. While one input/output device 530 is shown, there may be multiple I/O devices such as a CD-ROM, hard drive, floppy disk, display, and keyboard as well as others. The system 10 for electronically tracking luggage may also be combined with a processor, such as a memory, digital signal processor, or microprocessor, in a single integrated circuit. It should be appreciated, however, that any known or conventional type of hardware can be used.

Additionally, the invention may be a software program stored on a computer readable storage medium (e.g., ROM) and executed by the processor. The stored information can be stored on a floppy disk, CD-ROM, RAM, HDD or any other suitable medium. The stored information could be in a table, database, or data structure suitable for use in electronically tracking luggage.

Having described specific preferred embodiments of the invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed as new and desired to be protected by Letters Patent of the United States is:

1. A method of tracking a piece of luggage comprising:
   monitoring the opening and closing of the luggage;
   determining whether the luggage is open;
   when the luggage is determined to be open, transmitting a first signal from a detecting device inside the luggage to a circuit inside the luggage to record status information that the luggage is opened, said status information consisting of a date, time and location of the luggage;
   periodically transmitting a second signal from a timing device inside the luggage to a circuit inside the luggage to record tracking information, said tracking information consisting of the date, time and location of the luggage;
   receiving said first or second signals comprising said status and tracking information, respectively;
   storing said transmitted tracking and status information in a storage device of said circuit; and
   transmitting an alert signal to a receiver outside of the luggage, when said tracking or status information is received by the circuit, to notify a user of the location of the luggage and to display said tracking or status information.

2. The method of claim 1, wherein said alert signal is transmitted in real-time to the user.

3. The method of claim 1, wherein said tracking information comprises information from global positioning satellite technology.

4. A computer readable storage medium containing a computer readable code for operating a computer to perform a method for tracking luggage, said method comprising:
   monitoring the opening and closing of the luggage;
   determining whether the luggage is open;
   when the luggage is determined to be open, transmitting a first signal from a detecting device inside the luggage to a circuit inside the luggage to record status information that the luggage is opened, said status information consisting of a date, time and location of the luggage;
   periodically transmitting a second signal from a timing device inside the luggage to a circuit inside the luggage to record tracking information, said tracking information consisting of the date, time and location of the luggage;
   receiving said first or second signals comprising said status and tracking information, respectively;
   storing said transmitted tracking and status information in a storage device of said circuit; and
   transmitting an alert signal to a receiver outside of the luggage, when said tracking or status information is received by the circuit, to notify a user of the location of the luggage and to display said tracking or status information.

5. The method of claim 4, wherein said tracking information comprises information from global positioning satellite technology.

6. A luggage tracking device comprising:
   an electronic luggage tag comprising:
      a circuit for storing tracking and status information in a storage device;
      a timing device for transmitting a first signal to said circuit to record said tracking information, said tracking information consisting of a date, time and location of a piece of luggage; and
      a detecting device for monitoring the opening and closing of the luggage, determining whether the luggage is open, and if the luggage is opened, transmitting a second signal to said circuit to record said status information, said status information consisting of a date, time and location of the luggage.

7. The luggage tracking device of claim 6, wherein said circuit transmits an alert signal, when said tracking information is received to notify a user the location of said luggage.

8. The luggage tracking device of claim 7, further comprising a receiving device for receiving said alert signal and for displaying said tracking information.

9. The luggage tracking device of claim 6, wherein said status information comprises information from global positioning satellite technology.

10. The luggage tracking device of claim 6, wherein said circuit transmits an alert signal, when said status information is received to notify a user that said luggage has been opened.

11. The luggage tracking device of claim 10, further comprising a receiving device for receiving said alert signal and for displaying said tracking information.

12. A system for tracking luggage comprising:

a processor coupled to a luggage tracking device, said luggage tracking device comprising:

an electronic luggage tag comprising:

a circuit for storing tracking and status information in a storage device;

a timing device for transmitting a first signal to said circuit to record said tracking information, said tracking information consisting of a date, time and location of a piece of luggage; and a detecting device for monitoring the opening and closing of the luggage, determining whether the luggage is open, and if the luggage is opened, transmitting a second signal to said circuit to record said status information, said status information consisting of a date, time and location of the luggage.

13. The system of claim 12, wherein said circuit transmits an alert signal when said tracking information is received to notify a user the location of said luggage.

14. The system of claim 13, further comprising a receiving device for receiving said alert signal and for displaying said tracking information.

15. The system of claim 13, wherein said status information comprises information from using global positioning satellite technology.

16. The system of claim 12, wherein said circuit transmits an alert signal when said status information is received to notify a user that said luggage has been opened.

17. The system of claim 16, further comprising a receiving device for receiving said alert signal and for displaying said tracking information.

* * * * *